United States Patent
Pinheiro et al.

(10) Patent No.: US 10,362,158 B2
(45) Date of Patent: Jul. 23, 2019

(54) APPLIANCE CONTROL SYSTEM AND METHOD

(71) Applicant: Muzzley, Sunnyvale, CA (US)

(72) Inventors: Eduardo Jorge Bemposta Pinheiro, Lisbon (PT); Domingos Jorge Salgado Bruges, Torres Vedras (PT)

(73) Assignee: Habit Analytics PT, LDA, Evora (PT)

( * ) Notice: Subject to any disclaimer, the term of this patent is extended or adjusted under 35 U.S.C. 154(b) by 873 days.

(21) Appl. No.: 14/156,412

(22) Filed: Jan. 15, 2014

(65) Prior Publication Data

US 2014/0201256 A1    Jul. 17, 2014

Related U.S. Application Data

(60) Provisional application No. 61/752,832, filed on Jan. 15, 2013.

(51) Int. Cl.
*G06F 15/16* (2006.01)
*H04M 1/725* (2006.01)
*H04M 1/2755* (2006.01)

(52) U.S. Cl.
CPC ...... *H04M 1/72533* (2013.01); *H04M 1/2755* (2013.01)

(58) Field of Classification Search
CPC ............................ G06F 15/16; H04M 1/72533
See application file for complete search history.

(56) References Cited

U.S. PATENT DOCUMENTS

| | | | | |
|---|---|---|---|---|
| 8,160,564 | B1* | 4/2012 | Gunasekara | G06F 3/04842 455/419 |
| 8,903,978 | B2* | 12/2014 | Zerr | H04W 4/008 709/223 |
| 2005/0096753 | A1 | 5/2005 | Arling et al. | |
| 2011/0210820 | A1* | 9/2011 | Talty | G06K 7/10237 340/5.8 |
| 2012/0276891 | A1 | 11/2012 | Bai | |
| 2012/0324076 | A1* | 12/2012 | Zerr | H04W 4/206 709/223 |
| 2013/0031261 | A1* | 1/2013 | Suggs | H04L 63/083 709/228 |
| 2013/0110936 | A1* | 5/2013 | Miura | H04W 12/08 709/204 |
| 2013/0205212 | A1* | 8/2013 | Sinha | G06T 1/0021 715/719 |
| 2014/0001253 | A1* | 1/2014 | Smith | G06Q 20/3276 235/375 |

* cited by examiner

*Primary Examiner* — Phuoc H Nguyen
(74) *Attorney, Agent, or Firm* — DLA Piper LLP (US)

(57) ABSTRACT

A system and method to control an appliance using a computing device, such as a smartphone. The system may have one or more computing devices (each with a control client) and one or more appliances that communicate over a backend control unit to allow a user with the computing device to virtually control the appliance.

11 Claims, 12 Drawing Sheets

APPLIANCE CONTROL SYSTEM AND METHOD

PRIORITY CLAIM/RELATED APPLICATION

This application claims priority under 35 USC 120 to and the benefit under 35 USC 119(e) from U.S. Provisional Patent Application No. 61/752,832, filed on Jan. 15, 2013 and entitled "Appliance Control System and Method", the entirety of which is incorporated herein by reference.

FIELD

The disclosure relates generally to a system and method for controlling and interacting with an appliance or third party technology and in particular to a system and method for controlling and interacting with the appliance using another device that is not a remote control of the device.

BACKGROUND

A remote controller for a device, such as a television or set top box are known. These remote controllers communicate with the device using infrared. The infrared communications adds a minimum latency of about 200 ms. However, for a human feel interaction, in real-time, a maximum latency is about 180 ms. As a result, typical remote controls cannot be used to provide real-time human interaction. Furthermore, most remote controls are specifically designed to work with a particular device, the particular television or set top box, or even a class of devices, like televisions. However, these known remote control devices cannot be used as a remote for any appliance.

DETAILED DESCRIPTION OF ONE OR MORE EMBODIMENTS

Figure 1:
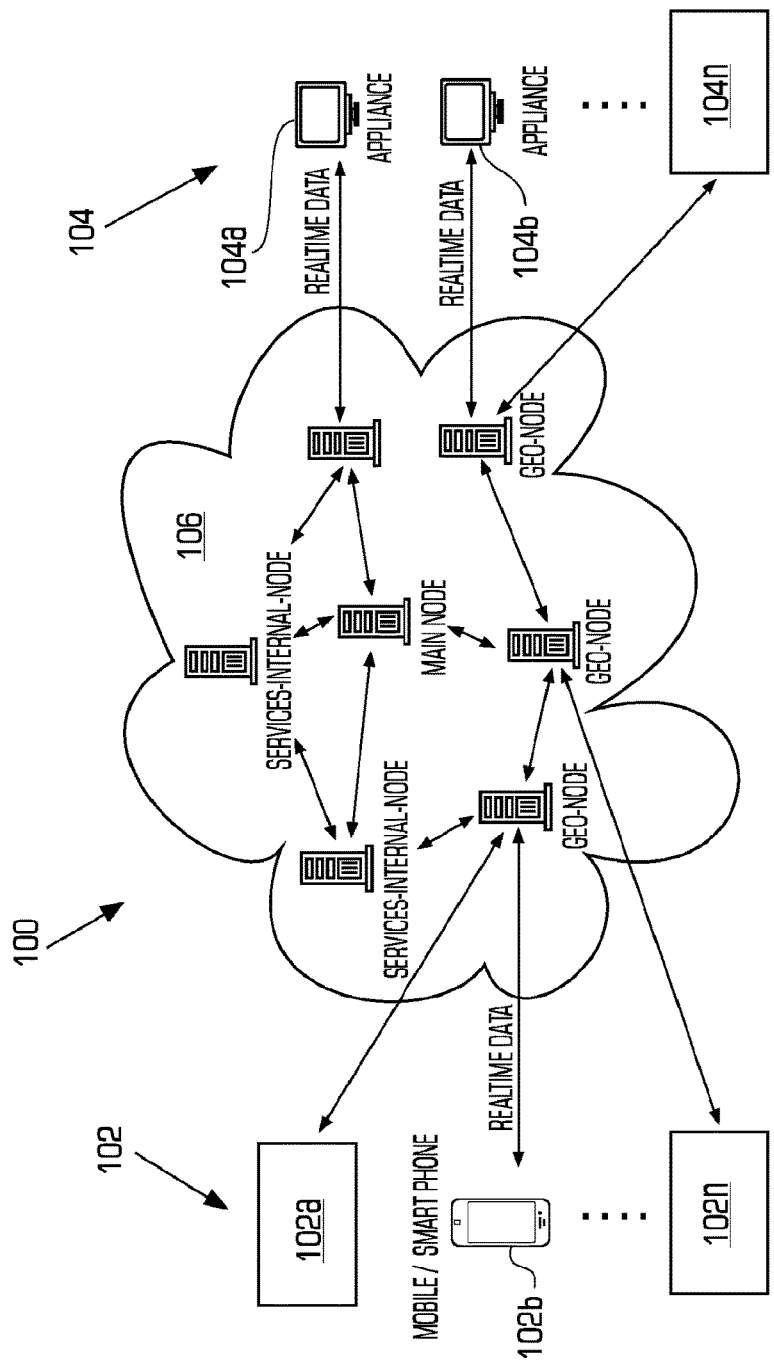
FIG. 1 is a high level diagram of an appliance control system.

The disclosure is particularly applicable to a cloud based appliance control system that uses smartphone devices to control a television appliance and it is in this context that the disclosure will be described. It will be appreciated, however, that the system and method has greater utility. The system and method may be implemented as a standalone computer, a client server type architecture, a software as a service type architecture and other computer architectures since the disclosure is not limited to any particular computer architecture implementation. Furthermore, the system and method may use various different computing device to act as a controller in addition to the specific smartphone examples below and the controller computing device may also be a personal computer, a tablet computer and the like since the system is not limited to any particular controller computing device. Furthermore, the system and method may be used to control various different appliances in addition to the television appliance described below since the appliance being controlled by the system may be a consumer electronics device, a home appliance, an air conditioner, an automobile, a gaming console, a personal computer, a smart TV, a set-top box, a digital video recorder (DVR), a computer, a router, a car system, a projector, a digital muppies, any other appliance that needs human interaction and/or any other network connected appliance that may or may not have a display/screen for user control. Each appliance may have a processor and memory and network connectivity. For an implementation in which the control component is a plurality of lines of computer code, the control component may be stored in the memory of the appliance and executed by the processor of the appliance.

The control system and method enable any appliance to have a machine/human interface. In one implementation, a computing device has a control client installed that transforms the computing device into several widgets using all the different features of the computing device such as sensors, flash, sound, microphone, video, screen and keyboard, among any other available on the system. The control client, for each different computing device, may have parameters and modules that are specific to each feature of the computing device that allows the control client to capture the values/data from each feature, such as an accelerometer, and transform the data/values into data that may be used to control the appliance. The control client may also have, for each different appliance that may be controlled, a set of features of the computing device to be used for control. The system allows the user of the computing device with the control client to interact with that appliance in a very quick and user-friendly way.

To allow the control client on the computing device to control/interact with the appliance, the system may pair the control client with the appliance being controlled and then start controlling it through a control address (such as muzz:// app123) that is provided via a QR Code, NFC communication, Serial Code and the like. The system may also pair the control client and the appliance using other communication mechanisms such as Bluetooth, Wi-Fi, auto-discovery and the like.

In order to be able to control and interact with any appliance, the system may require the control client to be installed on the computing device. The system standardizes the interaction for the end user and standardizes these interactions for developers that integrate with the control system. In each computing device, there may be physical keyboard, joystick, mouse, PlayStation controller, monitor, for instance, and the control client translates/abstracts that control device for the developer so that those controls become transparent to the developer if the user is using his computing device with a virtual or a physical keyboard.

During the control of an appliance, the control system may communicate control actions to the developer. In particular, the control system generates and communicates dynamic control objects instead of raw sensor or control values when user-generated control events occur. It may also send raw information, if requested. In one embodiment, the control client may have a feature library for each computing device that has, for each feature of the computing device, the feature's output data and a process to convert the data for each feature's output data into a higher level abstraction that is used in the dynamic control objects. For example, if a feature of the computing device is an accelerometer, the developer may receive a control event, such as the user made a baseball movement based on the accelerometer data, with a strength of x, speed of y, with a particular angle, instead of all individual values of each sensor.

FIG. 1 is a high level diagram of an appliance control system 100. The control system may have one or more computing devices 102 that may be used to control one or more appliances 104 through a backend control unit 106 by sending control data between the computing devices and the appliances over the network.

Each computing device 102 may be a processing unit based device with a display/screen, memory and connectivity to interact with the network 106 and the appliances 104. Each computing device 102 may be, for example, a smartphone, a tablet, a padphone or any other mobile device 102b, such as an Apple iPhone, an Android operating system based device, Windows mobile based device or other device capable of connecting to the network, a personal computer, a tablet computer and the like. In one implementation, each computing device may store and execute, using a processing unit of the computing device, a control client that allows the computing device to control the appliances as described below in more detail. The control client may be a plurality of lines of computer code and may be downloadable to the computing device, provided to the computing device on a piece of computer readable media or pre-installed on the computing device. Each computing device may have a processing unit, a memory, that may be persistent and/or temporary, circuits that provide wired or wireless connectivity and one or more control sensors that provide control action raw data to the control client. The one or more control sensors/features may be a physical keyboard, a virtual keyboard like that used in an Apple iPhone, a joystick, a mouse, a PlayStation controller, an Xbox controller or a Wii controller, a touchscreen monitor, a accelerometer, a tilt sensor, a location determining sensor/system, a proximity sensor, a gyroscope, an accelerometer, a compass, an ambient light sensor, a camera, a microphone, a speaker, a touchscreen, a near field communication (NFC) reader, a global positioning service (GPS) device/sensor, one or more light emitting diodes (LED), a vibration sensor, a flash device or any other sensor or component that can be accessed by user applications running on these computing devices.

The control client may be stored on the computing device and executed by the processing unit of each computing device when the computing device is being used as a control device. The control client may include one or more predefined control modules for one or more features/sensors of the computing device, such as GAME_PAD, WHITEBOARD, TRACKPAD, KEYBOARD, etc. that allow those features/sensors to be used for controlling the appliance. These predefined modules may be slightly configurable and customizable. In addition, the system may also allow the user to define one or more custom control modules for different virtual components and/or actual physical components/sensors of the computing device that define, for the particular component, how to use the component as part of the controlling function of the appliance. For example, a custom control module may be for a humidity sensor that has the data format for the output of that humidity sensor and the process by which the output data for the humidity sensor is converted into the control objects to control an appliance. In one implementation, the custom control modules may be stored in the control system computers and may be associated to the user/developer who defined them. When the computing device is instructed by the control client application running on the appliance that it has to load (transform itself into) a given controller type, the control client receives the mentioned description, parses it and transforms the computing device accordingly. From that point onward, the control client uses the custom control module to send the required messages depending on the user's interaction and the sensor's detected and interpreted actions.

Each appliance 104, such as appliance 104a, 104b, . . . , 102n, may be controlled by the control system. Each appliance may incorporate a piece of hardware or piece of software that allows the control system to control the appliance. The piece of hardware or piece of software may be downloaded onto the appliance, provided on a computer readable media or pre-installed on the appliance. Each appliance may be a consumer electronics device, a home appliance like a refrigerator, an air conditioner, an automobile, a gaming console, a personal computer, a smart TV, a set-top box, a digital video recorder (DVR), a computer, a router, a car system, a projector, a digital muppies, any other appliance that needs human interaction and/or any other internet connected appliance that may or may not have a display for user control, but have the installed control library.

The backend control unit 106 may include the backend control units/components and may also interconnect the computing devices 102 to the appliances to control the appliances. The backend control unit, in one implementation, may be a cloud that uses cloud computing resources. The computing devices 102 and the appliances may connect to and communicate over a network that is part of the backend control unit which may be any type of data layer like the internet, wired Ethernet, a cellular wireless data network, such as 3G/4G/WCDMA, LTE or EDGE, a wireless local area network, such as Wi-Fi and the like and other wireless data networks since the system is not limited to any particular network. The backend control unit 106 may further comprise one or more geo-nodes, one or more services-internal-node and at least one main node that are interconnected together as shown and also connectable to the one or more computing devices 102 and the one or more appliances 104. These nodes together comprises the back end control system and provide a way to scale using the multiple geo-nodes. Each geo-node is a replica of the standard servers located in different geographic locations (including continents) so that the system can optimize the network performance for users in different countries. The geo-located node groups communicate and share data in real-time between them. The one or more services-internal-nodes may each be "workhorse" servers which are responsible for executing and computing longer-running tasks. In one implementation, each of the these nodes may be implemented by cloud computing resources (server computers) that execute a plurality of lines of computer code to implement the functions and operations of the control system. The cloud hosted servers may be one or more web servers, one or more database servers and one or more cache servers.

Using the control system, a computing device that is executing the control client is able to pair to an appliance (using a QR Code, NFC or a serial code, etc.) by providing the IP address of the appliance or by finding it automatically. The appliance may be executing a control application that may include software that is created by the third-party developer and that uses the specific library for the particular hardware and/or operating system of the appliance. Each control application executing on the appliance communicates with the backend control system (using function calls provided by the library that is part of the control application) with its own particular application key (similar to a user logging into web sites with their username/password) that was assigned to them by the back end control system upon the creation/registration of that control application by the developer. Once the control application is registered and logged into the backend control system, the control application of the appliance may create a new "Activity" in the back end control system (using the library's provided functions) and is now ready to be controlled. This means that the backend control system is aware that this certain control application (running on a given appliance) exists and is available. Also, the backend system may describe this particular Activity through a QR code or alphanumeric string which contains the Activity's identifier. When the computing device wants to control this appliance, the computing device may scan the QR code (for example) and tells the backend system that the particular computing device with the control client wants to join the corresponding Activity. Thus, the backend system may be aware of both sides (the control system and the appliance) that are responsible for the pairing. After this point, all messages including registration info, sensorial data and video/audio streams are transmitted through the backend system and delivered on the other side.

Based on the pairing, the control system pairs the computing device with the appliance so that the appliance may be controlled by the computing device. The speed of the control system is such that the control system can transmit the control data 10 to 20 times faster than a typical smart TV controller.

In the QR code example, the QR code is an address (http://muzzley.com/play/356d01cfc42d755d129ec133bb50d5b1). If the QR Code is read with a generic application, the user can follow the link and be informed in the control system website that he must download the control client through a direct link to the Apple App Store or the Android Play Store, for example. If the QR Code is read from the control client itself, the context identifier string can be parsed, and the actual context information requested.

Figure 9:
FIG. 9 illustrates a user operating the computing device as a controller using the control client.

As an example, a user with a computing device that is executing a control client may pair/link to an appliance to be controlled, such as a television on which a game is being played. Once the control client is linked to the appliance, the control client is customized for the particular appliance (type of control, size of screen given the size of the display of the computing device, etc.) during a set-up process, such as a visual representation of a steering wheel and control buttons for a driving game as shown in FIG. 9. Once the control client is set-up, the user of the computing device uses the computing device (and its sensors) to control the appliance. For example, the user may tilt and rotate the computing device (that has an accelerometer) to control a game in a game being displayed on the appliance. In one embodiment, the control client may covert the computing device sensor/ device values into control actions that are communicated to the appliance by the backend control unit. In this way, any computing device that is executing the control client is able to initialize, set-up and control any appliance.

Figure 12:
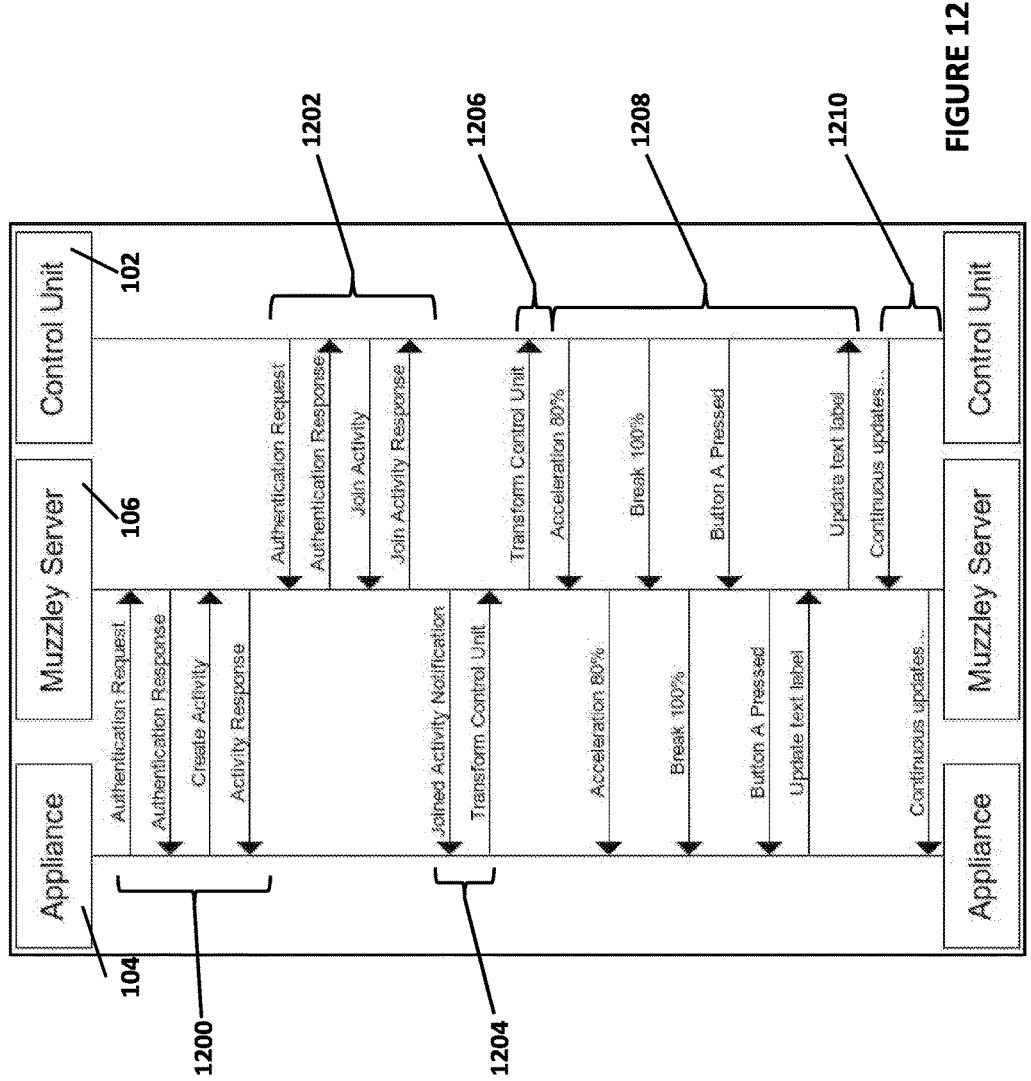
FIG. 12 illustrates an example of the interaction between a control client on the computing device and an appliance.

An example of the interaction between the control client in the computing device 102, the controlled appliance 104 and the backend control system 106 is shown in FIG. 12. The interaction may include an appliance authentication process 1200 between the appliance 104 and the backend control system 106. That process may include an authentication request from the appliance (and the control application being executed on the appliance) and an authentication response from the backend control unit 106 to the appliance. The process also may include the creation of an activity by the appliance and the activity response by the control backend unit 106. Following with authentication process, the appliance (and the control application being executed on the appliance) is authenticated to be controlled by a computing device executing the control client.

The interaction may also include a control client authentication process 1202 between a control client executing on a computing device 102 and the control backend system 106. That process may include an authentication request from the control client (being executed on a particular computing device) and an authentication response from the backend control unit 106 to the control client. The process also may include a join activity request by the control client to the control backend unit 106 to be able to control the appliance associated with the activity being joined and a join activity response from the control backend unit 106 indicating that the control client may be used to control the appliance through the control system.

Once the appliance 104 and the control client are associated with the same activity (paired), the appliance 104 may receive a joined activity notification and may then send out a transform control unit request (1204.) The transform control unit request contains the data and instructions so that the control client on the computing device can be transformed into a controller for the particular appliance. For example, if the appliance is a game console that is executing a driving game (such as is shown in FIG. 9), the transform control unit request may include instructions to set up a steering wheel controller (such as is shown in FIG. 9) that may be done by using an accelerometer sensor in the computing device. Furthermore, the transform control unit request may also specify the data output from the accelerometer sensor in the computing device and how that raw sensor data is going to be interpreted into steering wheel movements (the dynamic control objects) that are used to control the appliance. The control client on the computing device may receive those transform control unit request (1206) from the control backend unit 106 and configure itself to be the controller for the appliance. At this point in the process, the control client of the computing device and the appliance are joined by the control backend unit 106 and the control client of the computing device may be used as a controller for the appliance.

Each time that a control client is going to be used to control an appliance, the transform control unit process occurs. This transform control unit process allows the control client (and the computing device) to be reconfigured for each appliance so that the computing device may be customized for each different appliance.

Once the transform control unit process has been completed, the control client on the computing device and the appliance may act as controller and controlled device using the control backend unit 106 to transfer data (1208.) As shown in the example in FIG. 12, the transformed control client may indicate various control actions based on the use of the computing device by the user, such as an 80% acceleration, a braking action, a button pressed and update to a label text for example, that are then communicated over the control system to the appliance to control the appliance. The interaction, when the control client and the appliance are joined to the same activity, may also exchange continuous updates (1210.)

Figure 2:
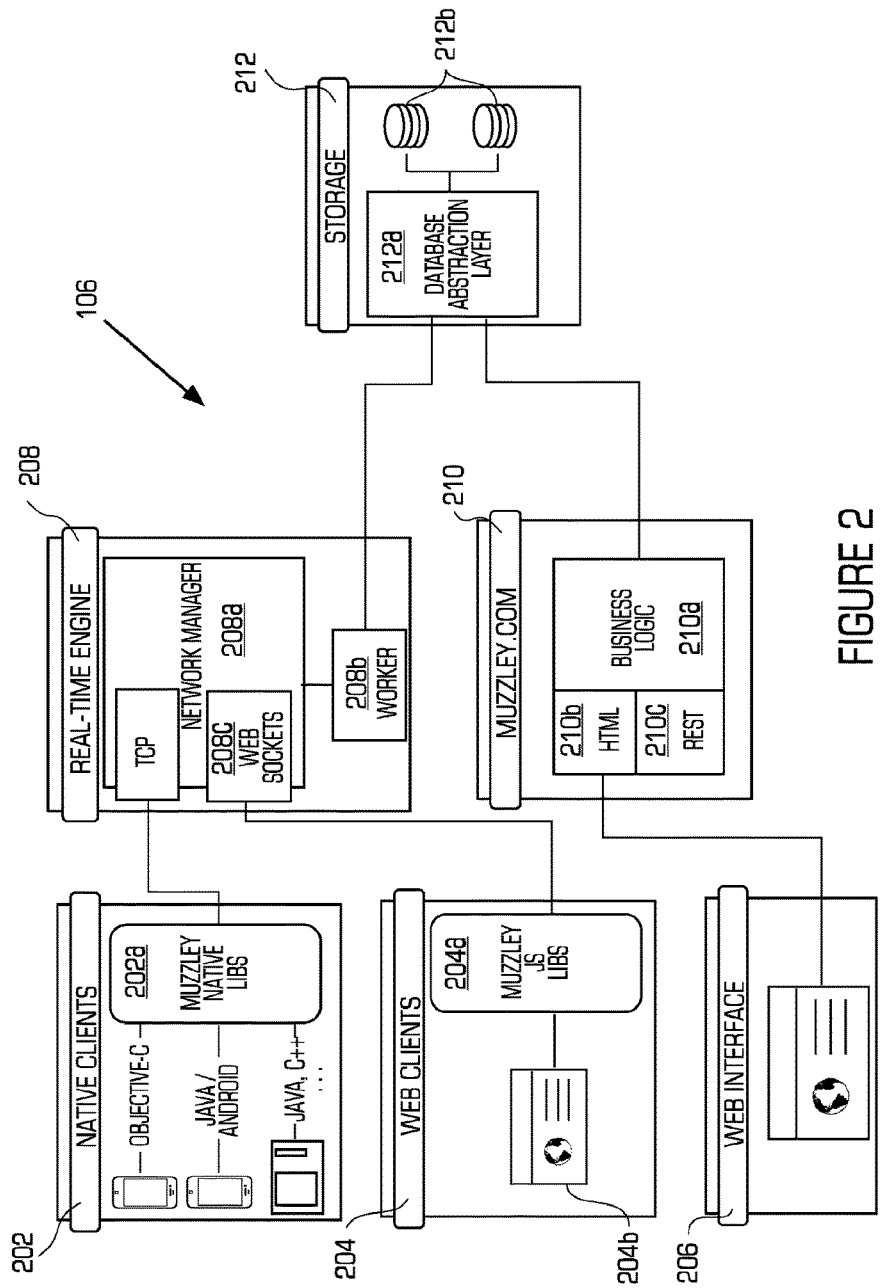
FIG. 2 is a diagram illustrating more details of the backend control unit that is part of the appliance control system.

FIG. 2 is a diagram illustrating more details of the backend control unit 106 that is part of the appliance control system. The backend control unit 106 may further comprise a native client portion 202 that contains a set of native libraries 202a for the different computing device control clients. For example, the control clients may use JavaScript, Objective-C, Java (Android) and C# (Windows Phone.) The native libraries 202a communicates with and exchanges data with a real-time engine 208. The backend control unit 106 may further comprise a web client portion 204 that may further include a Javascript library 204a. The web client is a control system application library written in JavaScript to be used in control clients that are web based (run inside web browsers,) The web client portion 204 communicates with and exchanges data with the real-time engine 208 through a web sockets component 208c, that may be implemented using SockJS & STOMP. The backend control unit 106 may further comprise a web interface 206 that communicates with a backend website portion 210, that may be built using node.js for example. The web interface 206 may be implemented using HTML, CSS and/or JavaScript. The communication between the various components of the control backend unit 106 may use, in one embodiment, AMQP, ZeroMQ or a proprietary application network protocol. Each appliance may communicate with the control backend unit 106 using various protocols, such as for example, raw TCP or ZeroMQ.

The backend control unit 106 may further comprise the real-time engine 208 that interfaces with the control clients on the computing devices, generates an abstraction of the control data and sends the control data onto the appliance being controlled. The real-time engine 208 may further comprise a network management unit 208a, that may be implemented in one example using a Message Queue, that provides robust messaging for applications using a known messaging protocol, such as for example, the AMQP protocol, or any other user defined protocol, when the network management unit is implemented with Message Queue. Further information about the Message Queue unit. One of the message queues muzzley uses is rabbit message queue, where its implementation and its operation may be found at http://www.rabbitmq.com/ which is incorporated herein by reference. The real-time engine 208 may further comprise a worker component 208b that is coupled to the messaging component and a storage component 212.

The backend website portion 210 may be implemented in node.js and may further comprise a set of business logic 210a, an HTML interface 210b and a REST interface 210c. The HTML interface is coupled to the web interface 206 as shown and generates the HTML pages. The business logic 210a is coupled to the storage component 212. The business logic 210a takes care of all the immediate processing that is required for all requests to the web site. Examples of those requests include the user authentication and authorization, loading and processing all system models such as users, applications and statistics.

The storage component 212 may further comprise database management unit 212a, that may be implemented using a Moongoose database unit that may be implemented in one embodiment in the known Mongo database and node.js, and one or more storage units 212b wherein each storage unit 212b may be a software or hardware implemented database systems. The storage component 212 may also implement a cache that may be implemented using Redis. The storage component may store all of the data of the control system. The storage component 212 may further comprise a database abstraction layer that acts as an interface between the business logic and the database engine (implemented in one embodiment as a NoSQL database).

Figure 3:
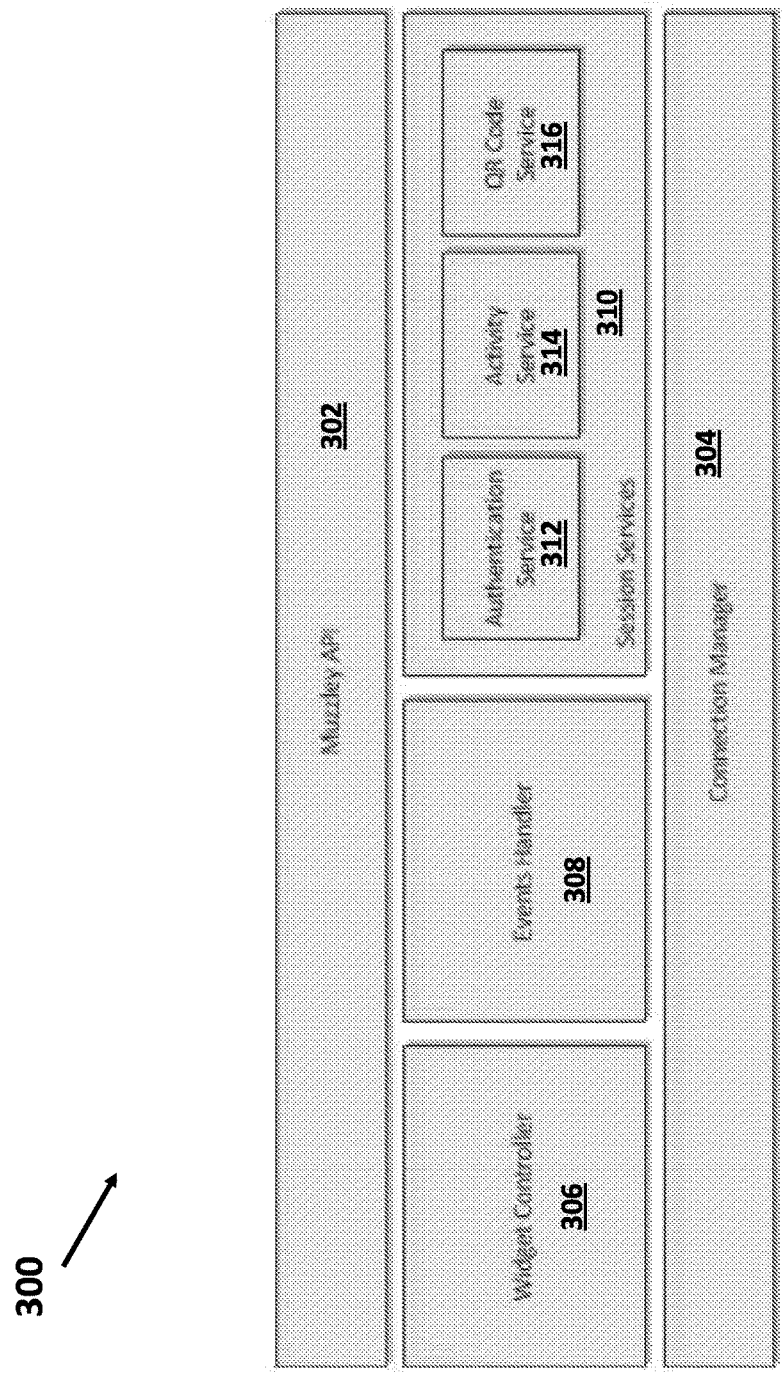
FIG. 3 is a diagram illustrating more details of the control client of the appliance control system that is resident on and executed by each computing device.

FIG. 3 is a diagram illustrating more details of the control client 300 of the appliance control system that is resident on and executed by each computing device to implemented the control system for the appliances. The control client may be a hardware device or a plurality of lines of code executed by a processing unit of the computing device. The control client may further comprise an application programming interface (API) 302, a connection manger 304, a widget controller 306, an event handler 308 and a sessions services component 310 that may further include an authentication service 312, an activity service 314 and a QR code service 316. The API 302 is an interface with a set of functions that abstract the whole underlying client library. The connection manager 304 abstracts the whole logic of creating and maintaining a connection to the control backend system 106 and sending and receiving messages/data to and from the backend system. The widget controller 306 is responsible for interpreting the different types of widgets (control client transformations) and the widget definition structures which the devices should embody and interpret the data that is generated by each widget and, optionally, transform it as necessary. The Event handler 308 is a component that helps triggering and receive notifications to and from all other components of the library. The session services 310 abstract the details of maintaining an authenticated usage session with the control backend system 106. The authentication service 312 is responsible for creating, managing and maintaining an authenticated session with the control backend system. The activity service 314 provides a way to join and otherwise interface with a certain activity of an appliance. The QR code service 316 manages and interprets the Activities' QR codes which allows the control client to join an activity of an appliance using a QR code.

Figure 4:
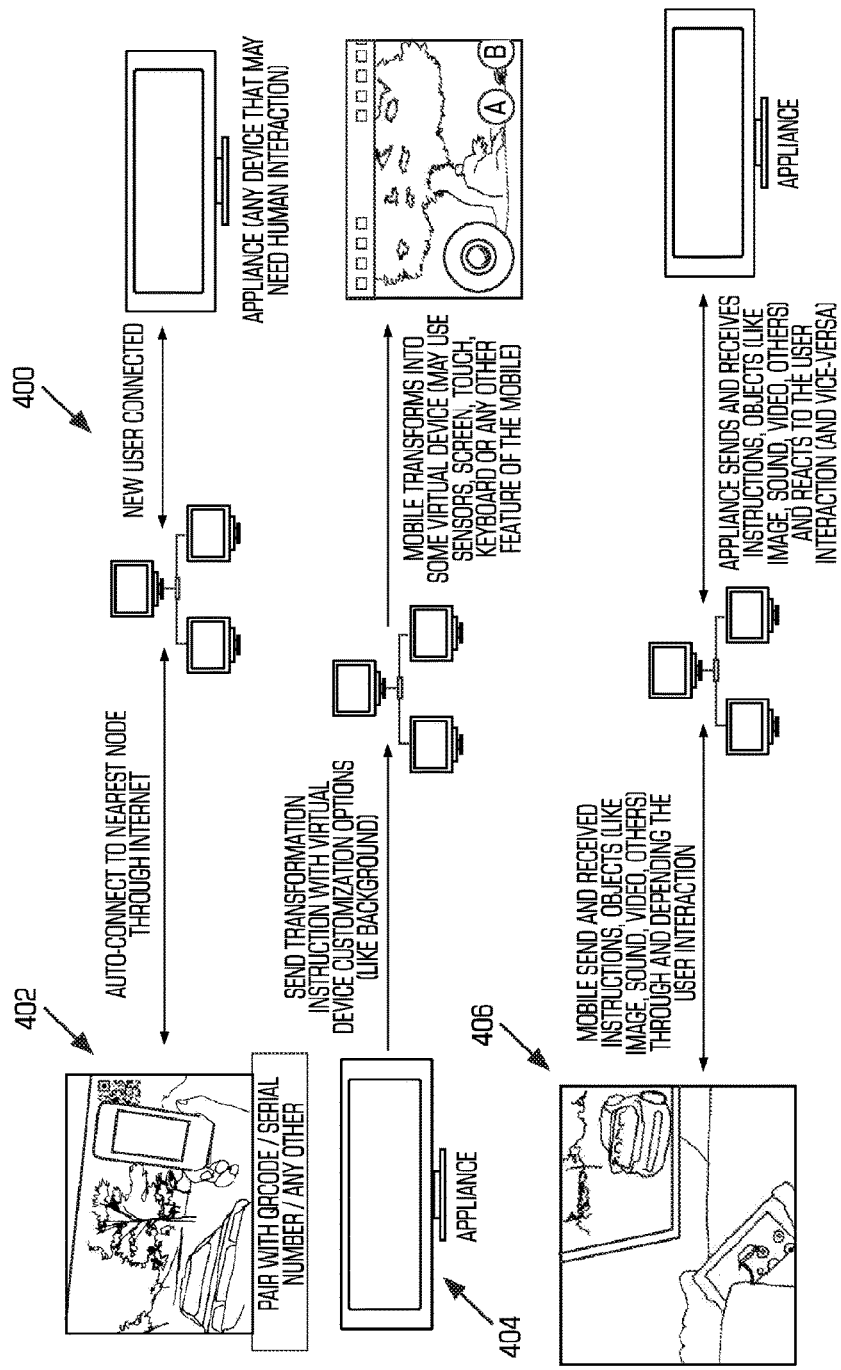
FIG. 4 is a diagram illustrating a method for controlling an appliance using the appliance control system.
Figure 5:
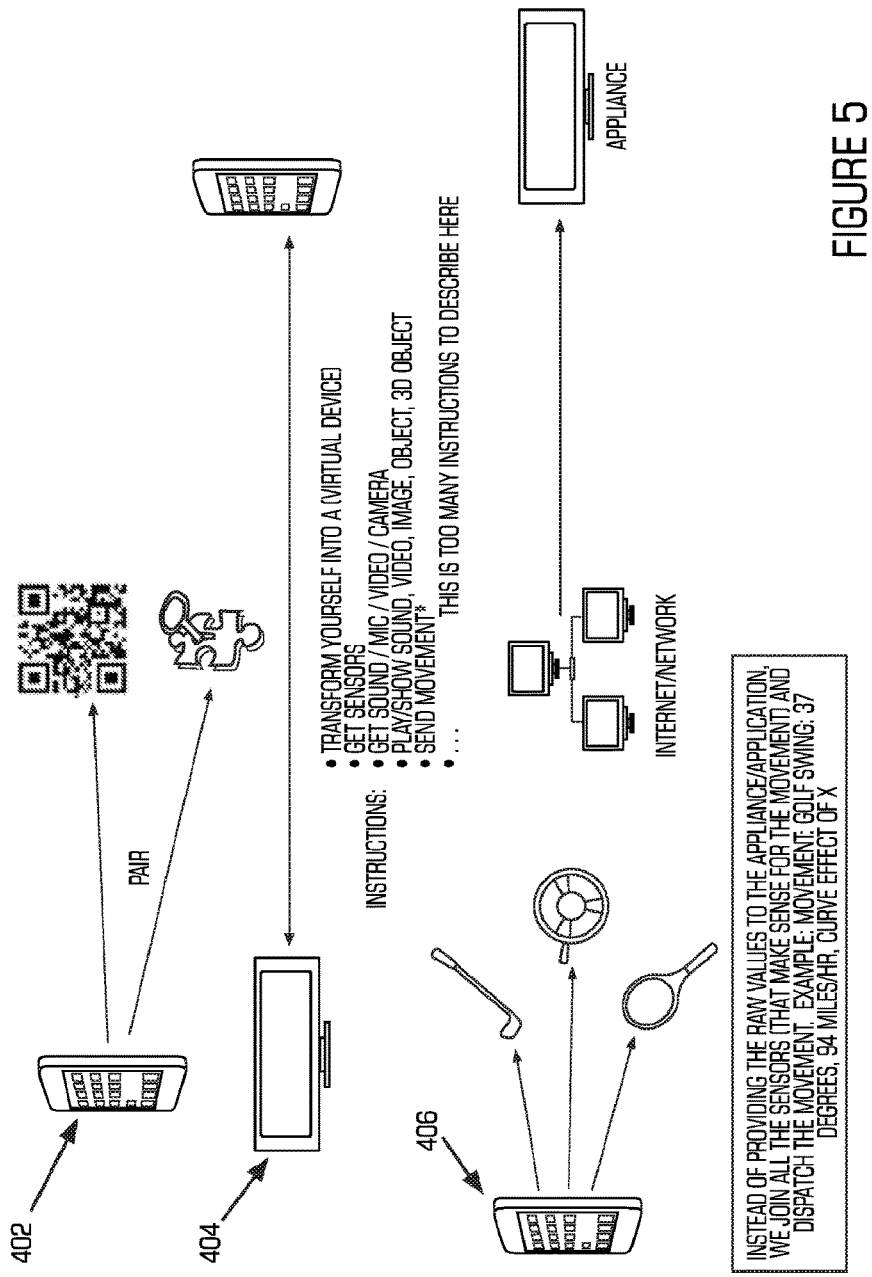
FIG. 5 illustrates more details of the method for controlling an appliance using the appliance control system.

FIGS. 4 and 5 are diagrams illustrating a method 400 for controlling an appliance using the appliance control system. The method may further involve an initialization process 402, a set-up process 404 and a control process 406. During the initialization process, the control client of the computing device pairs to the appliance and then auto-connects to the nearest node of the backend control unit 106 which in turn connects to the appliance to be controlled by the computing device.

During the set-up process 404, the appliance (that is executing a control component) sends transformation instructions (the transform control process described above) to the computing device with virtual device customization options, like backgrounds, type of controls for the appliance, the display of each control on the computing device, etc. as described above with respect to FIG. 12. For example, for a game pad controller, the transform control process may define what kind of directional input the gamepad should have. For instance, the computing device may have a fixed-position analog joystick and the widget defines at which levels of sensitivity (e.g. 25%, 50%, 75%, 100%) it should trigger events to be sent to the appliance. Alternatively, the particular widget may choose a dynamically positioned joystick whose center position is defined according to wherever the user puts his thumb on the screen. As another alternative, the widget may define a traditional four-way digital cross. In addition, the number of buttons of the controller and their layout can also be parameterized and defined. The widget may also define which events of the computing device (a click, button_down, button_up, etc.) should be considered to be sent to the controlled appliance. The visual representation of these events can also be configured with different background images.

Based on the transformation instructions, the computing device transforms into the virtual control device with the appropriate controls, such as a steering wheel control for a driving game using the accelerometer of the computing device. During the control process 406, the computing device and the appliance being controlled sends and receives control instructions and objects (images, sounds, video, etc.) over the backend control system 106 to each other to allow the computing device to control the appliance.

Figure 6:
FIG. 6 illustrates an example of a user interface of the control client on a computing device being used to control an appliance.

FIG. 6 illustrates an example of a user interface of the client on a computing device 102 being used to control an appliance 104. As shown in FIG. 6, the user is imaging a QR code displayed on the appliance (a television in this example) using the camera of the computing device. The imaging of the QR code is an example of one way to pair the computing device to the appliance to control the appliance using the computing device.

Figure 7:
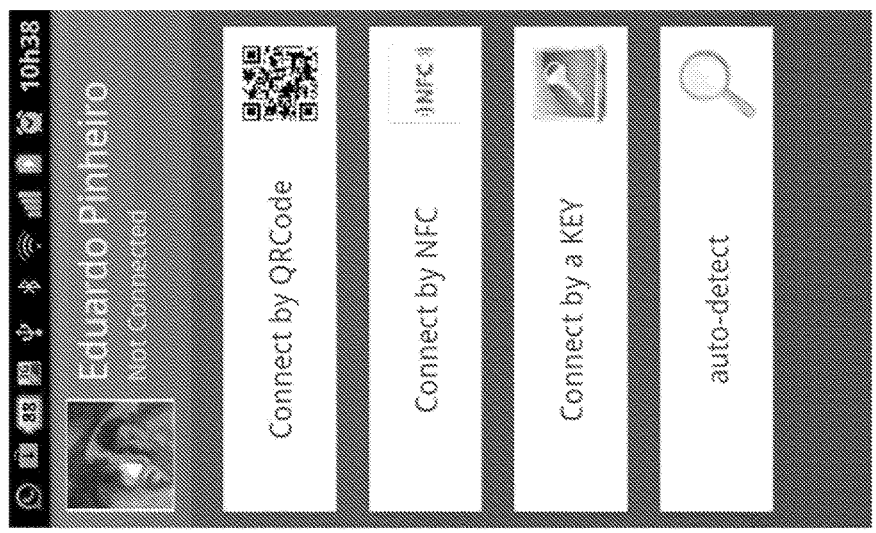
FIG. 7 illustrates an example of a user interface of the control client on a computing device.
Figure 8:
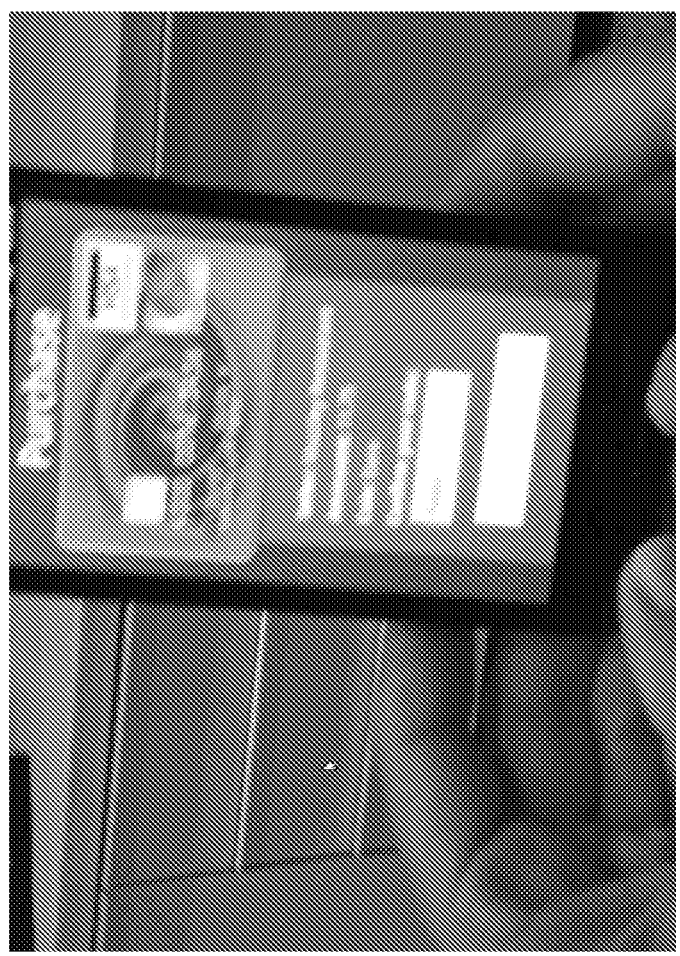
FIG. 8 illustrates an example of a user interface of the control client for purchasing the control feature.

FIG. 7 illustrates an example of a user interface of the control client on a computing device. The user interface of the control client, when being executed by the computing device, allows the user to pair with an appliance in several different ways. The different ways may include pairing/connecting using a QR code, connecting/pairing by NFC, connecting/pairing using a key and/or auto detecting an appliance that is close to, or in the same local network as, the computing device. FIG. 8 illustrates an example of a user interface of the control client for purchasing the control feature.

FIG. 9 illustrates a user operating the computing device as a controller using the control client. In this example, the user of the computing device is using the computing device to act as a steering wheel and control buttons for a driving game (as shown by the white circle representing the steering wheel and the "A", "B", "C" and "D" buttons being the controls. For example, the user may tilt and rotate the computing device (that has an accelerometer) to turn the steering wheel in the driving game being displayed on the appliance. In one embodiment, the control client may covert the computing device sensor/device values into control actions that are communicated to the appliance by the backend control unit.

Figure 10:
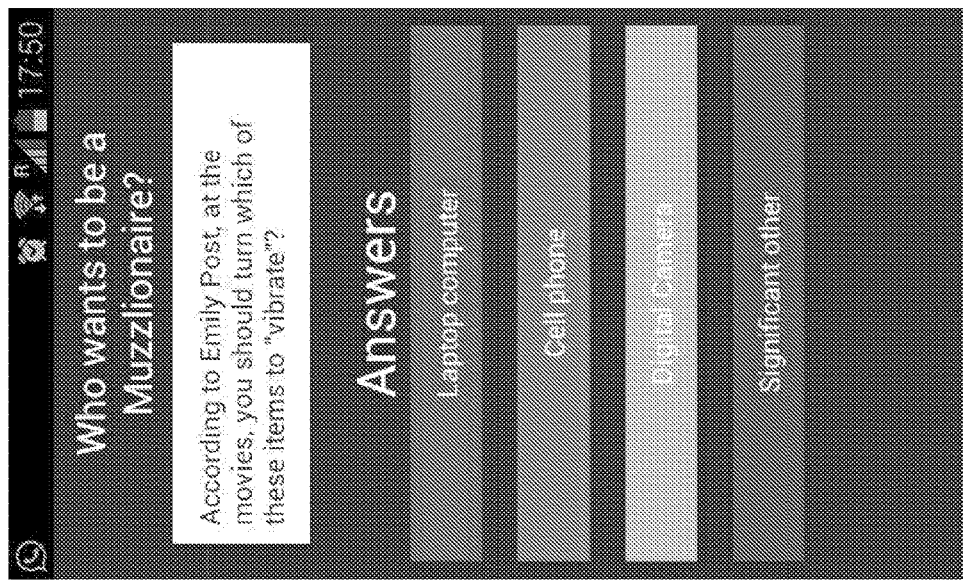
FIG. 10 illustrates another example of the control client being used to control an appliance.
Figure 11:
FIG. 11 illustrates another example of the control client being used to control an appliance.

FIG. 10 illustrates another example of the control client being used to control an appliance in which the computing device is being used to select answers for a game show being displayed on an appliance. FIG. 11 illustrates another example of the control client being used to control an appliance in which the computing device is being used to control a different type of game.

The control elements that may be implemented using the control client of the control system may be, for example, a physical movement device, such as a joystick, driving wheel, keyboard, payment machine, tennis racquet, a golf club or any widget with physical movement, an identification element (the computing device can identify you), to pass objects (images, sound, video, text, other) from the appliance or appliance application to your computing device (or vice versa), touch movements on touch screen, lamp, microphone, move virtual objects in other appliances/application running in an appliance through the touch screen.

In one example, each computing device may represent a pixel and a group of computing devices may make up a big screen or several different screens. In another example, the control system may be used to make waves of color with all the computing devices. The computing device with the control client may also be used as a monitor/screen without a cable. The computing device with the control client may also be used interact with a televisions show such as in shown in FIG. 10.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A computing device, comprising:
a processing unit,
a memory that stores a control client;
the control client being executed by the processing unit to connect to an appliance, receive transformation data from the appliance when the appliance is connected and providing control instructions to the appliance when the computing device has been manipulated so that the computing device is a virtual control device of the appliance.

2. The device of claim 1, wherein the control client one of is installed on the computing device, downloaded to the computing device and provided to the computing device on computer readable media.

3. The device of claim 1 further comprising one or more features that are used to control the appliance.

4. The device of claim 3, wherein the one or more features are one or more of a sensor, a flash, a microphone, a video, a screen and a keyboard.

5. The device of claim 4, wherein the one or more features further comprises one of a joystick, a mouse, a game console controller, a touchscreen monitor, an accelerometer, a tilt sensor, a location determining sensor/system, a proximity sensor, a gyroscope, a compass, an ambient light sensor, a camera, a speaker, a near field communication (NFC) reader, a global positioning service (GPS) device/sensor, one or more light emitting diodes (LED), a vibration sensor and a flash device.

6. The device of claim 1, wherein the appliance is one of a consumer electronics device, a home appliance, an air conditioner, an automobile, a gaming console, a personal computer, a smart TV, a set-top box, a digital video recorder (DVR), a computer, a router, a car system, a projector and a digital muppies.

7. The device of claim 1, wherein the computing device is a processing unit based device with a display, a memory and a connectivity circuit.

8. The device of claim 7, wherein the computing device is one of a smartphone, a tablet, a padphone, a personal computer and a tablet computer.

9. A method for controlling an appliance, comprising:
connecting a computing device having a control client to an appliance;
setting up the computing device based on transformation instructions from the appliance; and
generating, by the computing device, control elements that are communicated to the appliance to control the appliance.

10. The method of claim 9, wherein generating the control elements further comprises generating and communicating dynamic control objects.

11. The method of claim 10, wherein generating dynamic control objects further comprises converting raw sensor data into an object for each feature of the computing device.

* * * * *